(12) United States Patent
Stern

(10) Patent No.: US 6,310,555 B1
(45) Date of Patent: Oct. 30, 2001

(54) WATER LEAK DETECTOR

(76) Inventor: Yosef Y. Stern, 1486 Union St., Brooklyn, NY (US) 11213

( * ) Notice: Subject to any disclaimer, the term of this patent is extended or adjusted under 35 U.S.C. 154(b) by 0 days.

(21) Appl. No.: 09/388,611

(22) Filed: Sep. 2, 1999

(51) Int. Cl.[7] ................................................. G08B 21/00
(52) U.S. Cl. ......................... 340/605; 340/602; 340/604; 338/35
(58) Field of Search .................................. 340/605, 604, 340/602; 338/35; 73/335.04; 364/505; 361/286

(56) References Cited

U.S. PATENT DOCUMENTS

| | | | |
|---|---|---|---|
| 3,864,659 | * 2/1975 | Furuuchi et al. | 338/35 |
| 3,983,527 | * 9/1976 | Ohsato et al. | 338/35 |
| 4,449,188 | * 5/1984 | Unoguchi et al. | 364/505 |
| 4,692,752 | * 9/1987 | Abel | 340/604 |
| 4,705,060 | 11/1987 | Goulbourne | 137/102 |
| 4,831,493 | * 5/1989 | Wilson et al. | 361/286 |
| 4,888,455 | 12/1989 | Hanson | 200/61.04 |
| 5,058,421 | 10/1991 | Alexander et al. | 73/49.2 |
| 5,153,564 | 10/1992 | Hoiberg | 340/605 |
| 5,345,821 | * 9/1994 | Reich et al. | 73/335.04 |
| 5,463,377 | * 10/1995 | Kronberg | 340/605 |
| 5,655,561 | 8/1997 | Wendel | 137/79 |

* cited by examiner

*Primary Examiner*—Jeffery A. Hofsass
*Assistant Examiner*—Phung Nguyen

(57) ABSTRACT

A system for the detection of the presence of undesirable moisture and drops or droplets of liquid effusing from piping systems at the first stage of appearance, comprising a low-battery alert, provision for the device to remain operative for at least 48 hours before the battery power is depleted, and sensitivity such that the presence of any unwarranted source of humidity will activate the alarm, including moisture from the proximity of the sweat of humans and from unwarranted pipe sweating (such as the cumulative effect thereof may cause water damage) will activate the alarm, alert the operator of the system to the onset of the problem, save energy, water, pumps, boilers, pipes and property, from intrusion and damage, and allow for the restoration of plumbing systems in a minimum of time.

The versatility, simplicity in operating, and miniaturization of the system is such that the device may be placed in multiple, remote areas of complex piping that confound access to a larger-sized system.

The monitoring device could be adapted by transmitting said alarm to a control panel such as for a large factory or residential institution, alerting the owner promptly to the location of the leak by unwarranted moisture.

1 Claim, 1 Drawing Sheet

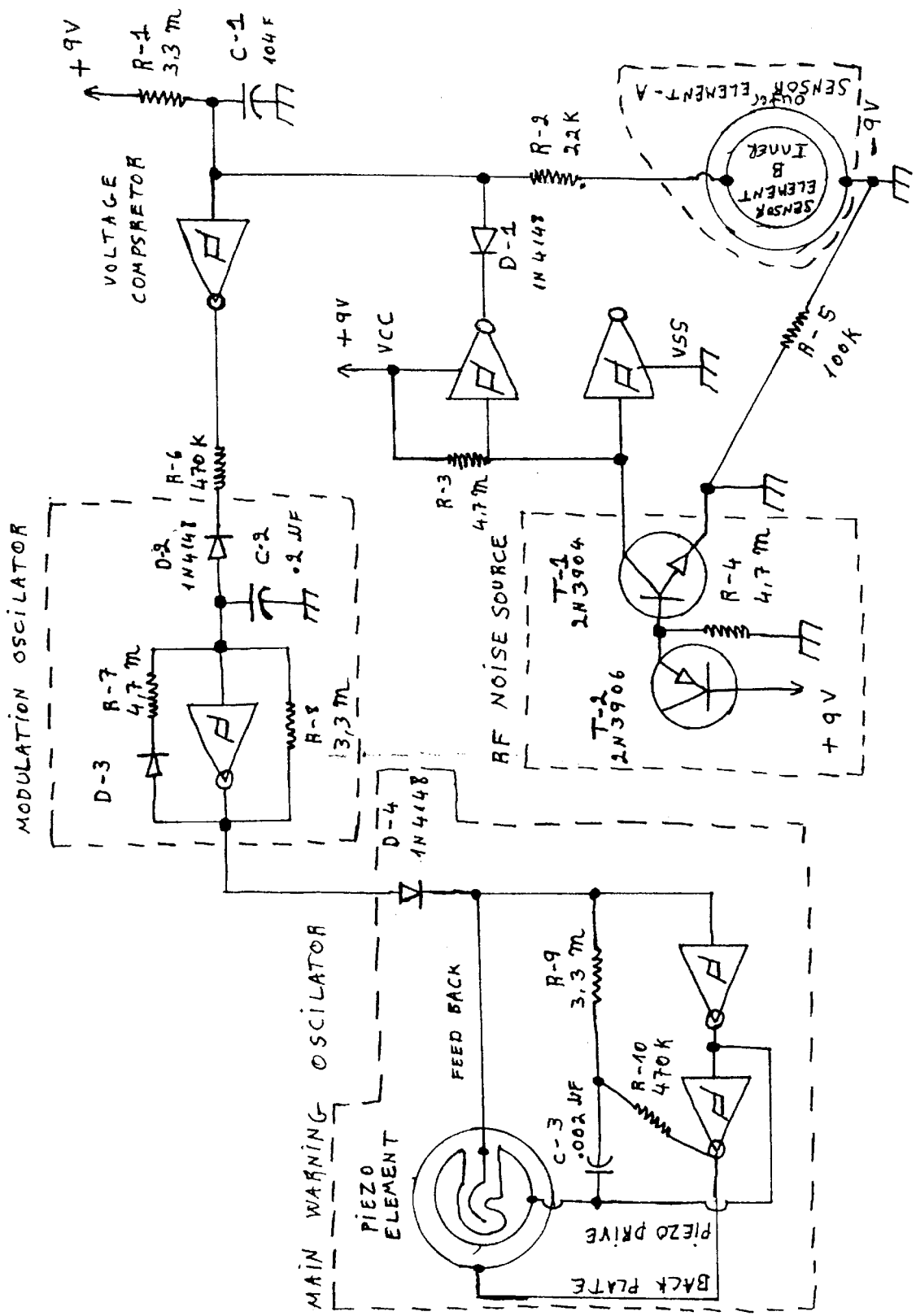

WATER LEAK DETECTOR

BACKGROUND OF THE INVENTION

The present invention is a system designed to sense leakage in plumbing pipe systems as well as water damage and other intrusions to piping systems at their onset, to locate the source of the leakage, and to promptly alert its operator, so as to prevent flooding, loss of energy or of water, and destruction of plumbing.

To be effective, a water leak detection system requires adaptability as to the placing of the sensor devices, and the microminiaturization necessary in the placing of the sensors in remote locations, as well as simplicity in installing the device. The prime element in the system is the sensor, which, acting by itself or in tandem with numerous sensors, should be able to sound an alarm once there is any evidence of undue increase in moisture in the form of a rise in humidity proximal to the sensor. What is unique in the water leak detector is that it alerts the operator to the source of leakage as soon as the leakage arises, such as the leakage from piping joints, pipe corrosion or stress, or intrusion by burglars. The importance of the current art is that it may be placed a pipe level rather than floor level, and typically responds several hours before any of the prior art will react.

PRIOR ART

Goulbourne's art is based on a series of sensors attached by wire to a central logic control unit. Its use today is limited to the chemical industry where there is a constant internal pressure whose deviation can be monitored.

Hanson's detector is for use in surface water, requiring such a degree of moisture as to physically render a material frangible, and does not reset, until or unless the collected moisture on the material re-evaporates. This is not as reliable method for detecting leaks at or near their source, where the leaks tend to be airborne droplets.

Alexander's system is useful in detecting changes in the level of static liquid tanks and in detecting leaks once there is flooding of ½ inch or more. This is not practical in detecting leaks when they arise, i.e. when a plumbing pipe is ruptured. In residential and business applications, the location of the plumbing pipes will be equipped with drainage. Thus, leaks will not be detectable when they arise.

Hoiberg's device contributes to the art with the conical shielding around the sensor. This is intended to sense liquid deposits on a flat surface and the cone is set into the sensor specifically so as not to respond to humidity. The mists that would signal the beginning of a leak are excluded from the system. Thus, it would require sensors too numerous to be economically practical. Moreover, Hoiberg's device must be operated at floor level. We would then have to wait until there is flooding, to sense the leak.

Furuuchi's device is a humidity sensor with the feature of being sufficiently sensitive to detect fogging, such as water over ½ mm. gaps. The graphs indicate (FIG. 4) that the device is intended to measure relative humidity between 80 and 90 percent. Droplets of water caused by leakage require, however, measurements of complete saturation (100% humidity).

Ohsato's sensor measures relative humidity. The average humidity on the surface depicted in his "FIG. 10" device is adapted for a rise in Relative Humidity from 40% to 100% (i.e. saturation) in 5.4 minutes. The reason is that Ohsato relies on the relative absorbtiveness of the medium. The reactions utilized begin with a physical reaction which is ultimately translated into a reaction of an electrical nature. The instant art, however, does not react to fogging but to jets or streams of water. Accordingly, our device responds within mircroseconds, thus avoiding false alarms arising from fogging in 90% relative humidity. The most common leak in plumbing is that of hot water through seams that connect copper piping. The typical seal in copper piping seams is 1/32" thick, and a fissure through the pipe and subsequently through the adhesive is evidence through a jet of water droplets with a diameter of or greater than 1/100". Placing the instant device opposite an adhesive bend in anticipation of likely fracture, the user is then alerted when the first droplet makes contact with the copper electrodes. Conversely, detecting the presence of fogging in the room is not the objective of the instant art.

Unoguchi's art is directed at the detection of various levels of humidity, while the instant art is simply aimed at the detection of saturation by droplets.

Abel's art is an offshoot of Relative-humidity detectors, rather than saturation. Abel attempts to solve the current-drain and ionization drawbacks in relative-humidity detectors. In contrast, the instant device reacts to the deposition of water droplets with a diameter of 0.01" on the sensor coil. Thus, unlike Abel, the conductivity need not be calibrated or reset. Ionization is prevented by means of a plastic casement. Moreover, in Abel's device, the accumulation of droplets such as in fogging will trigger its alarm, while in the instant device the sensor's surface is limited so as to preclude fog detection.

Wilson's art consists of awater sensor that detects deposits of water 1/67" in diameter and is connected to a windshield wiper motor. It relies on total capacitor output, which in turn, is influenced by cumulative moisture absorbtion rather than a simple stream of leakage.

Reich's art senses relative humidity through a film whose dielectric constant is altered according to the relative moistness of the sensor medium.

Kronberg's art as an improvement in sensing the presence of liquids is that the detector comes equipped with a "dry"-type sensor that reacts to moisture, as "FIG. 6". It measures moisture by contact with a pipe, but does not measure by size, such as water droplets, because Kronberg's art measures total conductivity change over a surface, rather than the bridging of 2 coils by contact with as little a quantity as one droplet.

SUMMARY OF THE INVENTION

A battery-powered liquid and humidity detection and alarm system comprising a transistorized moisture sensor, alarm system, and low-battery alert. The sensor aspect of the device is in the form of an outer and inner ring of copper coils and is positioned in place by a rubber or similarly flexible strip. The presence of moisture on the sensor element causes a forward bias in the transistor, triggering an audible alarm or flashing light. The sensor is sensitive as to detect unwarranted moisture as the presence of human sweat or several molecules of water droplets in contact with the sensor element. the alarm is also capable of being wired to a remote radio-operated control unit, and a landline to notify a plumber.

DESCRIPTION OF THE DRAWING

FIG. 1 is a schematic view of the detector circuit, in which a transistor 7, comprising a base, collector, and emitter, forms the outer and inner liquid sensing operating elements.

The base has a pair of spaced contacts, 23 and 8, the former of which is connected to the base, and the latter is connected to a voltage source at terminal. The emitter is connected to the ground and the connector is connected to an alarm sink input 23 fed an input of current. The alarm sink input 23 is pulled to ground when a valid input is received.

When an increase in the relative humidity in the location in which the device is placed exceeds the desired amount or when droplets or drops of liquid greater in volume than the desired quantity are in contact with contacts 3 and 2 the fluid acts as a resistive contact between its base contact, thereby causing a forward bias of transister 7. Operation of the transistor by a conductive fluid bridging across said contacts causes the alarm sink output 1 to activate an auditory alarm buzzer 4, a warning light or an input to an RF transmitter for signalling a remote control panel.

1. The sensing element shall consist of two conductors spaced evenly apart and connected to a high input impedance buffer stage.
2. In the absence of moisture, there shall be a fixed, minimum leakage of the wide band ac random voltage from one conductor in the sensing element to the other.
3. A close examination of the schematic will reveal that the sensor is part of a voltage divider circuit. In this manner the change in leakage current is converted to a change in ac voltage which is then rectified by diode "d1" in FIG. 1.
4. The circuit relies upon the internal hysteresis of the gate to differentiate between a wet voltage level (logic 0), or a dry voltage level (logic 1).
5. An audible alarm is generated through the use of dual oscillators. The initial trigger for the oscillator comes from the output of the gate used as the voltage comparator previously described.
6. The principle of operation makes use of the logic gate's internal switching thresholds so that when the battery voltage falls below a voltage determined by the gate's internal voltage reference, the voltage detection and trigger circuit cannot suppress oscillator operation.

DESCRIPTION OF DEVICE

Device shall consist of a sensing element, a means of converting the signal present at the sensing element to an audible alert when droplets of moisture come into contact with the sensing element, and a means of differentiating between dry and wet states of the sensing element. The circuit's elements shall be divided as follows:

a) The sensing element
b) A wide-band random voltage source to drive the sensing element
c) A means of converting that random ac voltage present at the sensor element to a dc voltage
d) A voltage comparator to detect level changes in the dc voltage proportional to the presence or absence of moisture
e) A dual oscillator device to generate an audible modulated tone to indicate the presence of moisture at the sensing element.

Purpose of Described Device

Purpose of described device is to provide the function of a moisture sensor. As such, it will emit an audible signal when a fluid is in contact with the sensor element. Unit shall be powered by any direct current power source of a voltage potential spanning 7.5 volts through 15 volts. In applications where the specified power source is to be a battery, the sensor unit shall have some means of indicating the end of the battery's useful life.

Practical Execution of Design

While it is possible to construct the previous elements discretely, or through the use of function specific integrated devices, such an approach would not be economical for mass production. The intended target for cost of production makes the use of an ASIC cost prohibitive in this case. What makes this application a novel improvement over prior design art is the exploitation of the characteristics of a CMOS logic hex schmidt trigger integrated circuit which is available as an off the shelf item. Exploiting this integrated device's design parameters, it is possible to construct all of the required device elements around the individual gates of this integrated device.

Let us start from the operating principle of the sensing element and work our way back towards the alarm oscillator.

Sensing Element; Voltage Level Detection, and Principles of Operation

The sensing element shall consist of two conductors spaced evenly apart and connected to a high input impedance buffer stage, and driven by a wide band random AC voltage. The sensor element conductors shall be arrayed in such a manner as to produce a fixed leakage current across the sensor elements. The presence of moisture shall be indicated by a sharp rise in leakage currents across the parallel conductors due to the ac current present.

In the absence of moisture, there shall be a fixed, minimum leakage of the wide band ac random voltage from one conductor in the sensing element to the other. In this application, the currents flow from one side of the sensor, to the ground buss. It is possible to operate the sensor in a balanced mode; but since this is a simple on or off type of trigger signal, no improvements in device performance would be achieved through the utilization of this technique and so the added expense and device complexity are not justified. Thus, we have an ac voltage present at the sensing element which is arrayed in such a manner as to provide a fixed leakage current to ground across a high impedance input.

The presence of moisture will cause these leakage currents to change, producing a corresponding change in the level of the voltage across the sensor. A close examination of the schematic will reveal that the sensor is part of a voltage divider circuit. In this manner the change in leakage current is converted to a change in ac voltage which is than rectified by diode "d1" in Figure one.

At this point, we now have two distinct DC voltage states which are indicative of the presence or absence of moisture. These are then fed to another schmidt trigger gate which is arrayed as a voltage level comparator, the circuit relies upon the internal hysteresis of the gate to differentiate between a wet voltage level (logic 0), or a dry voltage level (logic 1).

The Voltage Comparator

Through the use of the logic gate's own internal reference used to sense the difference between logic states we eliminate the need for external reference diodes, and other components normally associated with a voltage level detector or comparator. Again, the device exploits the native characteristics of the integrated circuit in order to keep the overall costs at a minimum.

The AC Random Voltage Source

Applicant will herein examine the random voltage source utilized here. This consists of transistors Q1 and Q2, which are arrayed as a zener noise source, exploiting the controlled avalanche or breakdown of the base to emitter junction of Q1, and a buffer emitter follower (Q2). This circuit is an inexpensive and simple noise source for random voltage generation across a wide frequency bandwidth. While Q1 should be selected for the optimum output of noise from this circuit, seeing as this is a non-critical application where sensitivity is not an issue (the presence of moisture produces a very large change in leakage currents), selection of transistors for Q1 should not be necessary.

The Audible Signal Source

An audible alarm is generated through the use of dual oscillators, one consisting of two gates differentially driving a piezoelectric transducer with feedback tuned to an audible carrier frequency of approximately 1 khz, and a second low frequency oscillator which modulates the carrier oscillator at a rate of 1 hz. This dual frequency approach makes the alarm easier to recognize and less likely to be masked by high ambient noise levels commonly found in industrial environments. The initial trigger for the oscillator comes from the output of the gate used as the voltage comparator previously described.

Battery Low Condition

In battery operated equipment that is to be left running in an unattended manner, it is often useful to know if the battery is in fact still capable of operating the device. The method of battery detections should not add excessively to the complexity of the design. Another concern is excessive power drain from the battery supply, as this would shorten the battery life. Once more we make novel use of the integrated device's internal design parameters in this sensor device to accomplish the task without adding any additional circuitry and without adding to the total power consumption. The principle of operation makes use of the logic gate's internal switching thresholds so that when the battery voltage falls below a voltage determined by the gate's internal voltage reference, the voltage detection and trigger device cannot suppress oscillator operation. This condition allows the audible alert signal to be produced. The secondary modulating oscillator (refer to "audible signal source") used to make an alternating tone is designed so that it cannot operate at this reduced voltage level, so a constant tone of one kilohertz shall be produced instead. This differentiates the low battery alert from the normal tone produced in the presence of moisture.

I claim:

1. A method for the detection of the presence of airborne water leakage in microscopic amounts, sufficiently miniaturized as to be placed in remote locations in plumbing pipes, and comprising a flexible sensor pad with an outer and inner ring of copper coils with water-protective sheathing, a transistorized electric circuit designed to respond to the presence of microscopic-sized water droplets, and an alerting system with audible and visible L.E.D. alarm and compatible with a central processing unit.

* * * * *